United States Patent
Preindl et al.

(10) Patent No.: US 11,711,009 B2
(45) Date of Patent: Jul. 25, 2023

(54) METHODS, SYSTEMS, AND DEVICES FOR SOFT SWITCHING OF POWER CONVERTERS

(71) Applicant: The Trustees of Columbia University in the City of New York, New York, NY (US)

(72) Inventors: Matthias Preindl, New York, NY (US); Liwei Zhou, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 151 days.

(21) Appl. No.: 17/076,133

(22) Filed: Oct. 21, 2020

(65) Prior Publication Data
US 2021/0126522 A1  Apr. 29, 2021

Related U.S. Application Data

(60) Provisional application No. 62/925,566, filed on Oct. 24, 2019.

(51) Int. Cl.
*H02M 3/158* (2006.01)
*H02M 1/00* (2006.01)

(52) U.S. Cl.
CPC ......... *H02M 1/0058* (2021.05); *H02M 3/158* (2013.01); *H02M 1/0003* (2021.05)

(58) Field of Classification Search
CPC .................... H02M 1/0058; H02M 1/0032
See application file for complete search history.

(56) References Cited

U.S. PATENT DOCUMENTS

| | | | |
|---|---|---|---|
| 4,814,962 A | 3/1989 | Magalhaes et al. |
| 4,855,888 A | 8/1989 | Henze et al. |
| 5,173,846 A | 12/1992 | Smith |
| 7,148,669 B2 | 12/2006 | Maksimovic et al. |
| 7,479,772 B2 | 1/2009 | Zane et al. |
| 9,660,527 B2 | 5/2017 | Glovinski |
| 9,991,742 B2 | 6/2018 | Mao |
| 2004/0051495 A1 | 3/2004 | Kaneko et al. |
| 2005/0258812 A1 | 11/2005 | Halberstadt et al. |

(Continued)

OTHER PUBLICATIONS

"UCC2870x constant-voltage constant-current controller with primary-side regulation datasheet" in , Dallas, TX, USA, 2017, [online] Available: https://www.ti.com/lit/ds/symlink/ucc28700.pdf?ts=1588017714167.

(Continued)

*Primary Examiner* — Alex Torres-Rivera
(74) *Attorney, Agent, or Firm* — Quarles & Brady LLP

(57) ABSTRACT

Disclosed are methods, systems, devices, and other implementations, including a voltage converter device that includes one or more inductive elements to deliver inductor current to an output section of the voltage converter device, at least one switching device to control current flow at the output section of the voltage converter device, and a controller to controllably vary, according to a predictive model, a subsequently applied switching frequency to the at least one switching device to maintain zero-voltage switching based, at least in part, on the inductor current of the one or more inductive elements.

22 Claims, 7 Drawing Sheets

(56) References Cited

U.S. PATENT DOCUMENTS

| | | | |
|---|---|---|---|
| 2009/0027025 A1* | 1/2009 | Latham | H02M 3/158 323/283 |
| 2010/0057223 A1 | 3/2010 | Kelly | |
| 2010/0083693 A1 | 4/2010 | Todd et al. | |
| 2015/0181352 A1 | 6/2015 | Astgimath et al. | |
| 2017/0070149 A1 | 3/2017 | Guan et al. | |
| 2017/0214252 A1 | 6/2017 | Preindl et al. | |
| 2017/0251535 A1 | 8/2017 | Huang et al. | |
| 2018/0138812 A1 | 5/2018 | Rose et al. | |
| 2020/0028462 A1* | 1/2020 | Kim | H02P 29/028 |
| 2020/0395854 A1* | 12/2020 | Yao | H02M 1/32 |

OTHER PUBLICATIONS

T. W. Ching and K. U. Chan, "Review of soft-switching techniques for high-frequency switched-mode power converters," 2008 IEEE Vehicle Power and Propulsion Conference, 2008, pp. 1-6, doi: 10.1109/VPPC.2008.4677473.

B. Wang, T. Q. Zheng and J. Zhang, "Voltage controlled variable capacitor based snubber for the further reduction of IGBT's turn-off loss," 2014 IEEE Energy Conversion Congress and Exposition (ECCE), 2014, pp. 935-940, doi: 10.1109/ECCE.2014.6953499.

Chang, et al., "Interleaving boost converters with a single-capacitor turn-off snubber," 2006 37th IEEE Power Electronics Specialists Conference, 2006, pp. 1-7, doi: 10.1109/pesc.2006.1711924.

S. S. Saha, B. Majumdar, T. Halder and S. K. Biswas, "New Fully Soft-Switched Boost-Converter with Reduced Conduction Losses," 2005 International Conference on Power Electronics and Drives Systems, 2005, pp. 107-112, doi: 10.1109/PEDS.2005.1619669.

Keeping, "A Review of Zero-Voltage Switching and its Importance to Voltage Regulation", Digi-Key Article Library. Aug. 2014.

Chu, et al., "Novel Zero-Voltage and Zero-Current Switching (ZVZCS) PWM Three-Level DC/DC Converter Using Output Coupled Inductor" in IEEE Transactions on Power Electronics, vol. 29, No. 3, pp. 1082-1093, Mar. 2014, doi: 10.1109/TPEL.2013.2260174.

Li, et al., "A Zero-Voltage Switching Three-Phase Inverter" in IEEE Transactions on Power Electronics, vol. 29, No. 3, pp. 1200-1210, Mar. 2014, doi: 10.1109/TPEL.2013.2260871.

Huang, et al., "Avoiding Si MOSFET Avalanche and Achieving Zero-Voltage Switching for Cascode GaN Devices," in IEEE Transactions on Power Electronics, vol. 31, No. 1, pp. 593-600, Jan. 2016, doi: 10.1109/TPEL.2015.2398856.

Corradini, et al., "Zero Voltage Switching Technique for Bidirectional DC/DC Converters," in IEEE Transactions on Power Electronics, vol. 29, No. 4, pp. 1585-1594, Apr. 2014, doi: 10.1109/TPEL.2013.2265019.

B. T. Kuhn and S. D. Sudhoff, "Performance characteristics and average-value modeling of auxiliary resonant commutated pole converters," SAE Technical Papers, vol. 14, No. 3, 1998.

M. Imaizumi and N. Miura, "Characteristics of 600, 1200, and 3300 v planar SiC-MOSFETs for energy conversion applications," IEEE Transactions on Electron Devices, vol. 62, No. 2, pp. 390-395, 2015.

Y. Lembeye, V. Dang Bang, G. Lef'evre, and J. P. Ferrieux, "Novel half-bridge inductive DC-DC isolated converters for fuel cell applications," IEEE Transactions on Energy Conversion, vol. 24, No. 1, pp. 203-210, 2009.

L. Zhang, X. Yuan, X.Wu, C. Shi, J. Zhang, and Y. Zhang, "Performance Evaluation of High-Power SiC MOSFET Modules in Comparison to Si IGBT Modules," IEEE Transactions on Power Electronics, vol. 34, No. 2, pp. 1181-1196, 2019.

C. Xiao, G. Chen, and W. G. Odendaal, "Overview of power loss measurement techniques in power electronics systems," IEEE Transactions on Industry Applications, vol. 43, No. 3, pp. 657-664, 2007.

B. Zhu, Q. Zeng, Y. Chen, Y. Zhao, and S. Liu, "A Dual-Input High Step-Up DC / DC Converter," vol. 34, No. 1, pp. 161-169, 2019.

Y. Rao, S. P. Singh, and T. Kazama, "A practical switching time model for synchronous buck converters," Conference Proceedings—IEEE Applied Power Electronics Conference and Exposition—APEC, vol. 2016—May, pp. 1585-1590, 2016.

G. Hua and F. C. Lee, "Soft-Switching Techniques in PWM Converters," IEEE Transactions on Industrial Electronics, vol. 42, No. 6, pp. 595-603, 1995.

Y. Shi, X. W. Gui, J. Xi, X. Wang, and X. Yang, "Large Power Hybrid Soft Switching Mode PWM Full Bridge DC-DC Converter with Minimized Turn-on and Turn-off Switching Loss," IEEE Transactions on Power Electronics, vol. 34, No. 12, pp. 11 629-11 644, 2019.

M. Kim and S. Choi, "A fully soft-switched single switch isolated DC-DC converter," IEEE Transactions on Power Electronics, vol. 30, No. 9, pp. 4883-4890, 2015.

X. Yu, J. Su, S. Guo, S. Zhong, Y. Shi, and J. Lai, "Properties and Synthesis of Lossless Snubbers and Passive Soft-Switching PWM Converters," IEEE Transactions on Power Electronics, vol. 35, No. 4, pp. 3807-3827, 2020.

B. Agrawal, M. Preindl, and A. Emadi, "Turn-off energy minimization for soft-switching power converters with wide bandgap devices," Proceedings of the IEEE International Conference on Industrial Technology, pp. 236-241, 2017.

J. Zhang, S. Member, J.-s. Lai, R.-y. Kim, and S. Member, "High-Power Density Design of a Soft-Switching High-Power Bidirectional dc-dc Converter," vol. 22, No. 4, pp. 1145-1153, 2007.

Z. Yao and S. Lu, "A Simple Approach to Enhance the Effectiveness of Passive Currents Balancing in an Interleaved Multiphase Bidirectional DC-DC Converter," IEEE Transactions on Power Electronics, vol. 34, No. 8, pp. 7242-7255, 2019.

J. Vijay Prabhu and P. Damodharan, "Explicit Model Predictive Control of Quadratic Boost Converter for High Step-Up Applications," in Proceedings of 2018 IEEE International Conference on Power Electronics, Drives and Energy Systems, PEDES 2018. IEEE, 2018, pp. 1-5.

J. Rodriguez, J. Pontt, C. Silva, P. Cort'es, U. Amman, and S. Rees,"Predictive current control of a voltage source inverter," PESC Record—IEEE Annual Power Electronics Specialists Conference, vol. 3, No. 1, pp. 2192-2196, 2004.

S. Bolognani, S. Bologani, L. Peretti, and M. Zigliotto, "Design and implementation of model predictive control for electrical motor drives," IEEE Transactions on Industrial Electronics, vol. 56, No. 6, pp. 1925-1936, 2009.

M. Preindl, E. Schaltz, and P. Thøgersen, "Switching frequency reduction using model predictive direct current control for high-power voltage source inverters," IEEE Transactions on Industrial Electronics, vol. 58, No. 7, pp. 2826-2835, 2011.

Zhang, and S. Chakraborty, "An Interleaved Series-Capacitor Tapped Buck," IEEE Transactions on Power Electronics, vol. 34, No. 7, pp. 6565-6574, 2019.

C. Y. Chiang and C. L. Chen, "Zero-voltage-switching control for a PWM buck converter under DCM/CCM bounda," IEEE Transactions on Power Electronics, vol. 24, No. 9, pp. 2120-2126, 2009.

A. Bemporad, F. Borrelli, and M. Morari, "Model predictive control based on linear programming—The explicit solution," IEEE Transactions on Automatic Control, vol. 47, No. 12, pp. 1974-1985, 2002.

M. Kvasnica and M. Fikar, "Design and implementation of model predictive control using Multi-Parametric Toolbox and YALMIP," Proceedings of the IEEE International Symposium on Computer-Aided Control System Design, pp. 999-1004, 2010.

Z. J. Shen, Y. Xiong, X. Cheng, Y. Fu, and P. Kumar, "Power mosfet switching loss analysis : A new insight," in IEEE Industry Applicalio11s Conference, 2006.

A. Merkert, J. Muller, and A. Mertens, "Component design and implementation of a 60 kw full sic traction inverter with boost converter," in IEEE Energy Conversion Congress and Exposition, 2016.

Y. Ren, M. Xu, J. Zhou, and F. C. ee, "Analytical Los Model of Power MOSFET," IEEE Tran actions on Power Electronics, vol. 21, No. 2,pp. 310-319,2006.

J. Rodriguez, J. Pontt, C. A. Silva, P. Correa, P. Lezana, P. Cortes, and U. Ammann, "Predictive current control of a voltage source inverter," IEEE Trans. Ind. Electron., vol. 54, p. 495503, 2007.

(56) References Cited

OTHER PUBLICATIONS

A. Bemporad, M. Morari, V. Dua. and E. N. Pi tikopoulos, "The explicit solution of model predictive control ia multiparametric quadratic programming," in ACC, 2000.

K. H. Liu and C. Y. Lee, "Zero-voltage switching technique in dc/dc converter," IEEE Transactions on Power Electronics, vol. 5, No. 3, pp. 293-304, 1990.

"GS66516T top-side cooled 650v e-mode gan transistor datasheet" in , Ottawa, ON, Canada, 2017.

S. Mariethoz and M. Morari, "Explicit model predictive control of a rPWM inverter with an LCL filter," CEEE Trans. Ind. Electon., vol. 56, No. 2,pp. 389 399,2009.

S. Kouro, P. Cortes, R. Vargas, U. Ammann, and J. Rodriguez, "Model predictive control—A simple and powerful method to control power converters," IEEE Tran . Ind. Electron . . . vol. 56, No. 6, pp. 1826-1838. 2009.

S. Vazquez, C. Montero, C. Bordons, and L. Fmnquelo, "Model predictive control of a VSI with long prediction horizon," in Proc. 201 I IEEE IJ1t. Symp. Industrial Electronics (ISIE), 2011, pp. 1805-1810.

Z. Song, C. Xia, and T. Liu, "Predictive current control of three-phase grid-connected converters with constant switching frequency for wind energy systems," IE E Tran . Ind. Electron., vol. 60, No. 6, pp. 2451-2464, 2013.

P. Cortes, J. Rodriguez, D. Quevedo, and C. Silva, "Predictive current control strategy with imposed load current spectrum," IEEE Trans. Power Electron., vol. 23, No. 2, pp. 612-618, 2008.

S. Kouro, B. La Rocca, P. Cortes, S. Alepuz, B. Wu and J. Rodriguez, "Predictive control based selective harmonic elimination with low switching frequency for multilevel converters," 2009 IEEE Energy Conversion Congress and Exposition, 2009, pp. 3130-3136, doi: 10.1109/ECCE.2009.5316041.

H. Aggrawal, J. I. Leon, L. G. Franquelo, S. Kouro, P. Garg and J. Rodriguez, "Model predictive control based selective harmonic mitigation technique for multilevel cascaded H-bridge converters," IECON 2011—37th Annual Conference of the IEEE Industrial Electronics Society, 2011, pp. 4427-4432, doi: 10.1109/IECON.2011.6120037.

R. Varga , P. Cortes, U. Ammann, J. Rodriguez, and J. Pontt, Predictive control of a three-phase neutral-point-clamped inverter, IEEE Trans. Ind. Electron., vol. 54, No. 5, pp. 2697-2705, 2007.

B. Bilgin et al., "Making the Case for Electrified Transportation," in IEEE Transactions on Transportation Electrification, vol. 1, No. 1, pp. 4-17, Jun. 2015, doi: 10.1109/TTE.2015.2437338.

M. Mohammadi, E. Adib, and M. R. Yazdani, "Family of soft-switching single-switch pwm converters with lossles passive snubber," IEEE Transactions on Industrial Electronics, vol. 62, No. 6, pp. 3473-3481, 2015.

M. Eull and M. Preindl, "Bidirectional three-level DC-DC converters: Sum-difference modeling and control," 2017 IEEE Transportation Electrification Conference and Expo (ITEC), 2017, pp. 573-578, doi: 10.1109/ITEC.2017.7993334.

D. Schumacher, P. Magne, M. Preindl, B. Bilgin and A. Emadi, "Closed loop control of a six phase interleaved bidirectional dc-dc boost converter for an EV/HEV application," 2016 IEEE Transportation Electrification Conference and Expo (ITEC), 2016, pp. 1-7, doi: 10.1109/ITEC.2016.7520233.

N. Mohan, W. P. Robbin, and T. Undeland, Power Electronics: Converters, Applications, and Design. Wiley, 1995.

X. Jia, D. Xu, S. Du, C. Hu, M. Chen and P. Lin, "A high power density and efficiency bi-directional DC/DC converter for electric vehicles," 2015 9th International Conference on Power Electronics and ECCE Asia (ICPE-ECCE Asia), 2015, pp. 874-880, doi: 10.1109/ICPE.2015.7167885.

H. Zhang, L. M. Tolbert and B. Ozpineci, "Impact of SiC Devices on Hybrid Electric and Plug-In Hybrid Electric Vehicles," in IEEE Transactions on Industry Applications, vol. 47, No. 2, pp. 912-921, Mar.-Apr. 2011, doi: 10.1109/TIA.2010.2102734.

X. Li, L. Zhang, S. Guo, Y. Lei, A. Q. Huang and B. Zhang, "Understanding switching losses in SiC MOSFET: Toward lossless switching," 2015 IEEE 3rd Workshop on Wide Bandgap Power Devices and Applications (WiPDA), 2015, pp. 257-262, doi: 10.1109/WiPDA.2015.7369295.

\* cited by examiner

METHODS, SYSTEMS, AND DEVICES FOR SOFT SWITCHING OF POWER CONVERTERS

CROSS-REFERENCE TO RELATED APPLICATIONS

This application claims priority to, and the benefit of, U.S. Provisional Application No. 62/925,566, entitled "Methods, Systems, and Devices for Soft Switching of Power Converters" and filed Oct. 24, 2019, the content of which is incorporated herein by reference in its entirety.

STATEMENT REGARDING FEDERALLY SPONSORED RESEARCH

This invention was made with government support under Grant Number 1653574 awarded by the National Science Foundation (NFS). The government has certain rights in the invention.

BACKGROUND

Energy losses during power conversion represent a significant limitation in high power electronic systems. Significant energy is lost when turning switches on or off, resulting in less efficient devices and pollution. For example, the power loss during turn on is usually 2-5 times larger than turn off (the parasitic device capacitor clamps the voltage to zero during turn off). To address this, soft switching techniques are used, where switches are operated at low voltages to reduce energy losses. With zero voltage switching (ZVS), the converter can operate such that the switches turn on only when the voltage across then device is zero (and no power losses occur).

High frequency power converters have been broadly used in chargers, electric vehicles, energy storage systems, solar systems, and other high-power applications. Wide band gap devices, including Silicon Carbide (SiC) and Gallium Nitride (GaN), are becoming some of the most popular switches used in such power applications because of their high frequency, low switching losses, and high-power density performances. However, the turn-on losses of the SiC or GaN switches are much higher than the turn-off losses.

SUMMARY

The present implementations and approaches are directed to a variable-frequency explicit model predictive control approach and an optimal frequency model predictive control approach to achieve zero voltage soft switching operation for the direct-current-to-direct-current (DC/DC) power converters. Under the variable-frequency explicit model predictive control approach (implemented, at least in part, based on off-line computations) for a DC/DC converter with the combination of critical soft switching, the precise critical soft switching boundaries for the converter are derived with the parameters of dead time and peak/valley inductor threshold current. This approach solves the problem of turn-on power losses during the transient period, which further improves the efficiency compared to the traditional PI controller. Under the optimal-frequency model predictive control approach (implemented, in some embodiments, as a run-time process, thus requiring a more expedient way of approximating/estimating control parameters), the critical soft switching boundaries for DC/DC converter are derived with the parameters of dead time and peak/valley inductor threshold current. This optimal frequency approach can be used with two types of frequency control methods/procedures to achieve fast response in case of the reference variation. The proposed approach can also eliminate turn-on power losses during the transient period to improve the efficiency compared to the traditional PI controller. Although the implementations described herein are discussed with reference to DC/DC voltage converters, the approaches may also be used in connection with AC/DC or DC/AC voltage converter devices.

Thus, in some variations, a voltage converter device is provided that includes one or more inductive elements to deliver inductor current to an output section of the voltage converter device, at least one switching device to control current flow at the output section of the voltage converter device, and a controller to controllably vary, according to a predictive model, a subsequently applied switching frequency to the at least one switching device to maintain zero-voltage switching based on at least a present switching frequency of the at least one switching device and the inductor current of the one or more inductive elements.

Embodiments of the voltage converter device may include at least some of the features described in the present disclosure, including one or more of the following features.

The controller configured to controllably vary the subsequently applied switching frequency to the at least one switching device to maintain zero-voltage switching may be configured to controllably vary the subsequently applied switching frequency to the at least one switching device to maintain the zero-voltage switching over a wide operating range.

The controller may include a proportional integral (PI) controller to determine a reference current, and a model predictive control (MPC) module arranged in a cascade to the PI controller, and configured to determine, based at least in part on the reference current and the inductor current, control-signaling to control one or more of, for example, a duty cycle, and/or the variable subsequently applied switching frequency for the at least one switching device.

The MPC module may be configured to determine the control signaling according to an optimization process using a cost function to minimize a current tracking error between the reference current and the inductor current of the one or more inductive elements, and maximize soft switching frequency of the at least one switching device.

The MPC module may be configured to determine the control signaling according to the optimization process subject to one or more constraints including, for example, a bounded frequency range, a maximum peak inductor current, a minimum peak inductor current, a maximum valley inductor current, and/or a minimum valley inductor current.

The controller configured to controllably vary the subsequently applied switching frequency may be configured to derive a searching methodology to determine the subsequently applied switching frequency as an output of the searching methodology based on one or more of, for example, the present switching frequency of the at least one switching device, a present duty cycle corresponding to the present switching frequency, and/or the inductor current of the one or more inductive elements. Entries of the search methodology may be determined according to an optimization process to minimize total power losses of the voltage converter device subject to the one or more constraints.

The controller configured to controllably vary the subsequently applied switching frequency may be configured to iteratively compute the subsequently applied switching frequency, according to sampled operating conditions for the at least one switching device, when sampling time of operating conditions of the voltage converter device exceeds a pre-determine threshold, or directly compute the subsequently applied switching frequency through application of a pre-determined function applied to the sampled operating conditions for the at least one switching device when the sample time of operating conditions is equal to or is below the pre-determined threshold.

The voltage converter device may include one of, for example, a DC/DC voltage converter device, an AC/DC voltage converter device, or a DC/AC voltage converter device.

The voltage converter device may further include one or more capacitance elements in the output section of the voltage converter device.

The controller may include a model predictive control (MPC) module configured to determine, based at least in part on the inductor current and voltage across at least one of the one or more capacitance elements, a duty cycle provided to a pulse width modulation (PWM) signal controller and a frequency controller configured to determine and generate the subsequently applied switching frequency to the at least one switching device.

The controller configured to controllably vary the subsequently applied switching frequency to the at least one switching device may be configured to determine the subsequently applied switching frequency from a plurality of discretized switching frequencies that are each an integer multiple, n, of a sampling frequency, $f_s$, to sample operating conditions of the voltage converter device based on which the inductor current of the one or more inductive elements is determined.

The controller configured to controllably vary the subsequently applied switching frequency to the at least one switching device may be configured to controllably vary the subsequently applied switching frequency to maintain zero-voltage switching further based on one or more of: soft switching boundary constraints, or output voltage measurements.

In some variations, a method for voltage conversion is provided that includes determining inductor current of one or more inductive elements of a voltage converter device, determining, according to a predictive model, a subsequently applied switching frequency for at least one switching device of the voltage converter device to maintain zero-voltage switching based, at least in part, on the inductor current of the one or more inductive elements, and controllably actuating the at least one switching device based on the determined subsequently applied switching frequency.

Embodiments of the method may include at least some of the features described in the present disclosure, including at least some of the features described above in relation to the voltage converter device, as well as one or more of the following features.

Determining the subsequently applied switching frequency may include intermittently determining the subsequently applied frequency at regular or irregular time intervals.

Controllably actuating the at least one switching device may include controllably actuating the at least one switching device according to the subsequently applied switching frequency to maintain the zero-voltage switching over a wide operating range.

Determining the subsequently applied switching frequency may include determining a reference current, and determining, based at least in part on the reference current and the determined inductor current, control-signaling to control one or more of, for example, a duty cycle for the at least one switching device, the variable subsequently applied switching frequency for the at least one switching device, and/or output voltage for the voltage converter device.

Determining the control-signaling may include determining the control signaling according to an optimization process using a cost function to minimize a current tracking error between the reference current and the inductor current of the one or more inductive elements, and maximize soft switching frequency of the at least one switching device.

Determining the control-signaling according to the optimization process may include determining the control signaling according to the optimization process subject to one or more constraints that include, for example, a bounded frequency range, a maximum peak inductor current, a minimum peak inductor current, a maximum valley inductor current, and/or a minimum valley inductor current.

Determining the control-signaling may include deriving a searching methodology to determine the subsequently applied switching frequency as an output of the searching methodology based on one or more of, for example, the present switching frequency of the at least one switching device, a present duty cycle corresponding to the present switching frequency, and/or the inductor current of the one or more inductive elements. Entries of the searching methodology may be determined according to an optimization process to minimize total power losses by the voltage converter device subject to the one or more constraints.

Determining the subsequently applied switching frequency may include iteratively computing the subsequently applied switching frequency, according to sampled operating conditions for the at least one switching device, when sampling time of operating conditions of the voltage converter device exceeds a pre-determine threshold, or directly computing the subsequently applied switching frequency through application of a pre-determined function applied to the sampled operating conditions for the at least one switching device when the sampling time of operating conditions is equal to or is below the pre-determined threshold.

Determining, according to the predictive model, the subsequently applied switching frequency may include determining the subsequently applied switching frequency from a plurality of discretized candidate switching frequencies that are each an integer multiple, n, of a sampling frequency, $f_s$, to sample operating conditions of the voltage converter device based on which the inductor current of the one or more inductive elements is determined.

In some variations, computer readable media is provided that includes computer instructions executable on a processor-based device to determine inductor current of one or more inductive elements of a voltage converter device, determine, according to a predictive model, a subsequently applied switching frequency to at least one switching device of the voltage converter device to maintain zero-voltage switching based, at least in part, on the inductor current of the one or more inductive elements, and controllably actuate the at least one switching device based on the determined subsequently applied switching frequency.

Embodiments of the computer readable media may include at least some of the features described in the present disclosure, including at least some of the features described above in relation to the voltage converter device and the method.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
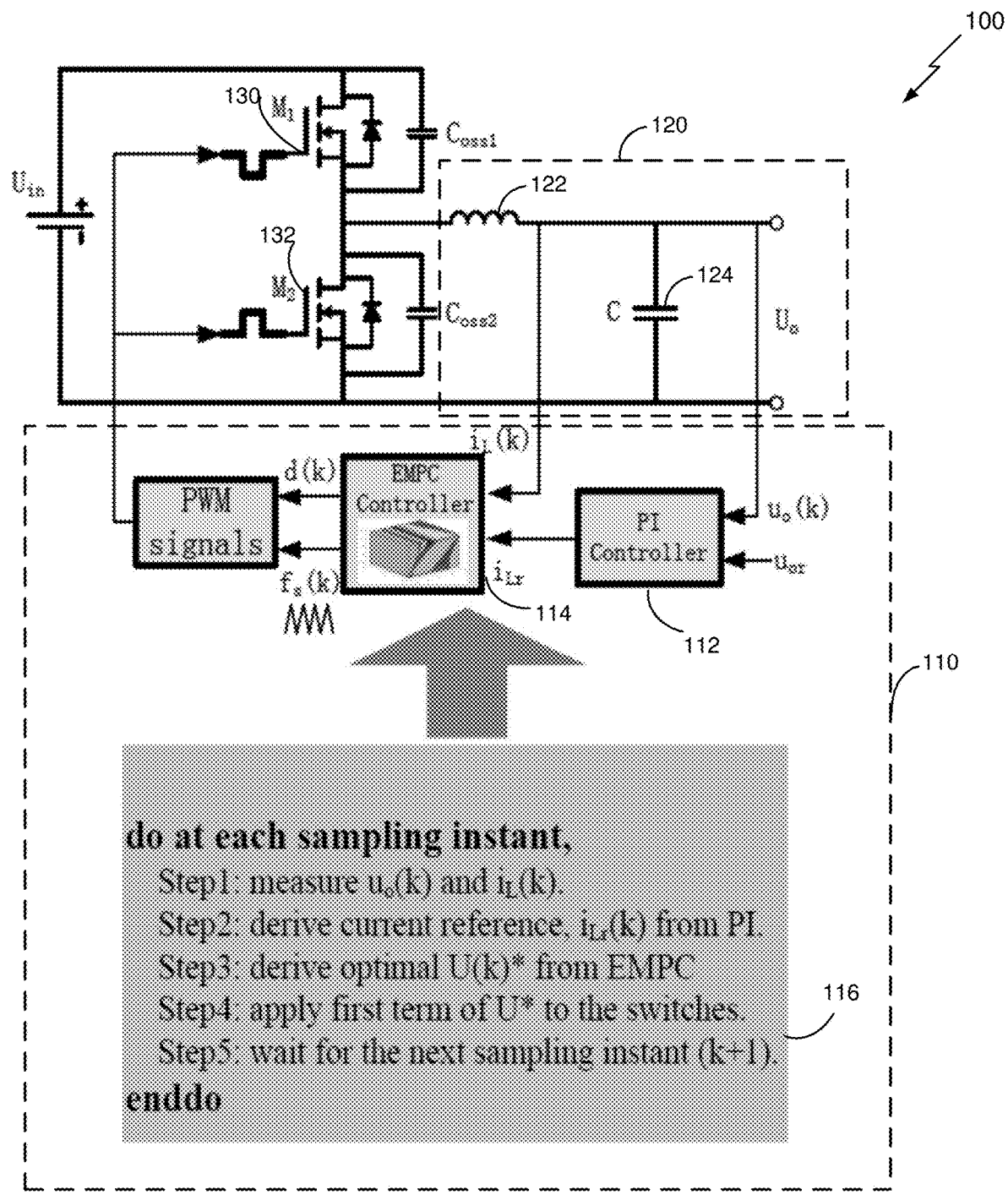
FIG. 1 is a circuit diagram of an example voltage converter device with a variable frequency model predictive control (MPC) implementation.

Disclosed are systems, methods, devices, circuits, and other implementations, that include the use of model predictive control (MPC) implementations to achieve zero voltage soft switching operation for power converters (including direct current-to-direct current (DC/DC) converters, and/or AC/DC voltage converter device). In some embodiments, such implementations can be cascaded implementations in which the realized controller has a layered structure, typically with a fast inner and a slower outer control loop (it is viable to implement a single loop). The approaches disclosed herein achieve soft switching by implementing a predictive control model and a voltage controller to achieve zero voltage soft switching. As such, the proposed approaches and technology has the potential to improve energy efficiency in high-power systems. In some embodiments of the proposed approaches, the switching frequency is considered as the input value in the controlling methodology. The soft switching constraints are included to achieve the soft switching operation with a fast response. During the load variation, the proposed controllers can maintain the soft switching and avoid oscillation. Furthermore, the explicit model predictive control implementations can use the offline optimization to generate an optimized searching procedure (such as a search tree) for operation, and thus alleviate the problem of insufficient calculation capability in high frequency mode. Approaches that use explicit model predictive control (EMPC) implementations generally refer to approaches in which part of the controllers' operations are computed offline and stored in a lookup table. Such implementations mitigate some of the challenges associated with implemented controllers that derive/compute controlling values (used for generation of controlling signals) in real-time (real-time, or on-line implementations are referred to as online MPC)

In some embodiments, zero voltage soft switching operation of the synchronous DC/DC converters described herein may be implemented by enlarging the inductor current ripple to make the minimum point of the current value below zero. If the minimum point of the inductor current value is lower than a threshold which is determined by the switch output capacitor and voltage level, the high turn-on losses of the upper switch can be replaced by the low turn-off losses of the lower switch. Thus, the switching losses can be largely decreased.

In some embodiments of the proposed EMPC approach, a two-stage cascaded controller is implemented. A first stage of the controller is a pre-stage realized using a Proportional-Integral (PI) voltage controller to provide the current reference, while the second stage is realized as an EMPC current controller to generate the duty cycle and variable frequency for soft switching. In at least some calculating periods, the output voltage is controlled by the PI controller stage, and the provides the current reference for the EMPC controller stage. In the model, the state value is set to be the inductor current, and the input values are set to be the duty cycle and frequency. The main goal of the model predictive controller is to track the inductor current as reference and minimize the error. The time period (or frequency) can be added into a cost function to maximize the frequency in the region of critical soft switching operation. In such embodiments, the cost function of the model can thus include two terms: a first term corresponding to minimization of a current tracking error, and a second term corresponding to maximization of frequency in the region of soft switching operation. The zero-voltage soft switching operation can be achieved by implementing the constraints on the state value of current and the input values of duty cycle and frequency. The constraints of the model are set to be the bounded frequency range, and maximum and minimum inductor current. During operation, the inductor current can be varied according to the reference or given by the voltage controller. The proposed EMPC controller tracks the reference current to achieve the zero-voltage soft switching by the constraints. The explicit MPC method may be implemented by solving the cost function problem, at least partly, offline and creating, for example, a search tree (or some other searching methodology) for online piecewise linear region searching. This allows for an increase of the switching frequency, and thus the volume of the passive components can be decreased. The power density can accordingly be improved with the proposed approaches. Explicit controllers can be stored as lookup tables or sets of control laws (for example a piece-wise linear or affine function that defines the controller behavior as a function of the system states). Based on the system states (inferred from the available measurements), the correct control law can be identified in real time, which can be done by using iterative methods. In practice, it is often beneficial to compute a (optimal or suboptimal) searching methodology (such as a search tree) that accelerates the time and computation required to identify the optimal control law.

Another advantage of the approaches described herein is that the zero voltage soft switching operations can decrease the switching losses. The implemented constraints of the MPC model is piecewise affine. The regions of the soft switching constraints are convex due to the piecewise linear characteristic and cascaded structure of the controller. This makes the implementation of an explicit MPC easier to generate with conventional programming languages (e.g., C code).

Possible applications of the proposed approaches described herein include solar systems, grid-connected converters, or other Direct Current to Alternating Current (DC/AC), Direct Current to Direct Current, and/or Alternating Current to Direct Current energy conversion systems.

With reference to FIG. 1, a circuit diagram of an example voltage converter device 100 with a variable frequency model predictive control (MPC) implementation is shown. The converter 100 (which is shown as a DC/DC converter, but may be adapted for AC/DC or DC/AC conversion operations) includes one or more inductive elements, such as an inductor 122, to deliver inductor current to an output section 120 of the voltage converter device 100, and further includes at least one switching device (and in the example device 100, two switching devices 130 and 132 are provided) to control current flow at the output section 120 of the voltage converter device 100. As further depicted in FIG. 1, the device 100 also includes a controller 110 to controllably vary, according to a predictive model, a subsequently applied switching frequency to the at least one switching device to maintain zero-voltage switching based, at least in part, on the inductor current of the one or more inductive elements. In some examples, the controller configured to controllably vary the subsequently applied switching frequency may be configured to controllably vary the subsequently applied switching frequency to maintain zero-voltage switching further based on one or more of, for example, soft switching boundary constraints, and/or output voltage measurements.

The controller 110 may be implemented as a processor-based device, a customized ASIC, or based on any other type of implementation. In a DC/DC converter device, for the critical soft switching, a large current ripple would typically be required to ensure negative valley inductor current to be lower than a threshold current level. In the turn-off transient period of the lower switch (the switching device 132 of FIG. 1), the negative inductor current will discharge the upper switch output capacitor, $C_{oss1}$ (i.e., of the switching device 130 of FIG. 1). The zero-voltage switching (ZVS) of the upper switch 130 can be achieved if the switch 130 is fully discharged before it turns on. The ZVS operation depends on the interlock time between the two switches and the value of inductor valley current.

The controller 110 may include a proportional integral (PI) controller 112 to determine a reference current, and a model predictive control (MPC) module 114 (such as an explicit model predictive control, or EMPC) arranged in a cascade to the PI controller 112, and configured to determine, based at least in part on the reference current and a determined (e.g., measured or estimated) inductor current ($i_L(k)$, where k is some time instance during the operation of the converter 100), control-signaling to control one or more of, for example, a duty cycle for the switching device(s), the variable, subsequently applied, switching frequency for the switching device(s), and/or output voltage of the voltage converter device. An MPC module is generally implemented to solve a constrained finite time optimal control problem including a cost/objective function and system constraints. In some examples, the MPC controller module 114 is configured to determine the control signaling according to an optimization process using a cost function to minimize a current tracking error between the reference current ($i_{L,r}$) and the inductor current ($i_L(k)$) of the inductive element(s) (in this case, the inductor 122), and maximize soft switching frequency of the switching device(s) (in this case the two switching devices 130 and 132). As will be discussed below in greater detail, the MPC module (or controller) 114 is configured to determine the control signaling according to the optimization process subject to one or more constraints that include, for example, a bounded frequency range, a maximum peak inductor current, a minimum peak inductor current, a maximum valley inductor current, and/or or a minimum valley inductor current. In some implementations, the controller 110 configured to controllably vary the subsequently applied switching frequency is configured to derive a searching methodology (e.g., a search tree) to determine the subsequently applied switching frequency as an output of the searching methodology based on one or more of, for example, the present switching frequency of the at least one switching device, a present duty cycle corresponding to the present switching frequency, and/or the inductor current of the one or more inductive elements. In such embodiments, entries of the search tree may be determined according to an optimization process to minimize total power losses of the voltage converter device subject to the one or more constraints. As noted, some embodiments to achieve soft switching are based on a variable frequency explicit model predictive control, implemented, at least in part, based on off-line computations. For the purpose of controlling the peak/valley inductor current in the critical soft switching regions, the duty cycle and frequency are set to be the two input values in the predictive model (because the duty cycle and frequency have strong coupling relationship in the discrete state equations, a new input value may be defined to replace the duty cycle).

Further details of the implementations of FIG. 1 follow. Generally, the model of a DC/DC converter can be expressed as:

$$L\frac{di_L(t)}{dt} = d(t) \cdot U_{in} - u_{out}(t), \text{ and}$$

$$C\frac{du_{out}(t)}{dt} = i_L(t) - i_{out}(t)$$

where C is the capacitance of the capacitor 124 of the output section 120 depicted in FIG. 1.

Discretizing the state equations yields:

$$i_L(k+1) = i_L(k) + \frac{U_{in} \cdot d(k) \cdot T_s(k)}{L} - \frac{u_{out}(k) \cdot T_s(k)}{L}, \text{ and}$$

$$u_{out}(k+1) = u_{out}(k) + \frac{i_L(k) \cdot T_s(k)}{C} - \frac{i_0(k) \cdot T_s(k)}{C}$$

The above discretization can be derived according to the forward Euler discretization method (approximation). Alternative procedures include the backward Euler method, the Tustin method, zero-order-hold method, etc.

From the above expression for $i_L(k+1)$ and $u_{out}(k+1)$, it can be seen that the input values of the duty cycle and the time period are coupled, which results in a nonlinear problem that is hard to solve for MPC implementations. To eliminate the coupled terms of the duty cycle and time period, the new state value of $d(k)T_s(k)$ can be set as $D(k)$. The vector of input value is then $[D(t), T_s(t)]$, and the above first state equation for $i_L(k+1)$ can be expressed as:

$$i_L(k+1) = i_L(k) + \frac{U_{in} \cdot D(t)}{L} - \frac{u_{out}(k) \cdot T_s(k)}{L}.$$

From the above derived state equation, another problem that emerges is the bilinear term of output voltage and time period, which is not feasible for explicit MPC optimization. For the purpose of solving the coupled term of output voltage and time period, a cascaded controlling procedure is proposed. The output voltage is firstly controlled by a PI controller (namely, the PI controller 112 of the controller 110 in FIG. 1) which provides the current reference for the MPC operation. Thus, the controlling part includes two cascaded stages: the first stage (the PI controller 112) of PI control for output voltage, and the second stage of EMPC controller (unit 114) for inductor current. Then, the output voltage can be approximately regarded as fixed, and will not influence the iteration of current control. The new decoupled state equation for the MPC implementation can be therefore updated as:

$$i_L(k+1) = i_L(k) + \frac{U_{in} \cdot D(t)}{L} - \frac{u_{out}(k) \cdot T_s(k)}{L}.$$

Thus, the state value, $X_k$, input value, $U_k$, parametric matrix, A and B for the discrete state equation can be expressed as:

$$X_k = i_L(k) - i_{Lr}(k),$$

$$U_k = [d(k) \cdot T_s(k); T_s(k)] = [D(k); T_s(k)], \text{ and}$$

$$A = [1]; B = \left[\frac{U_{in}}{L}, -\frac{U_{out}}{L}\right].$$

The main goal of the model predictive controller is to track the inductor current as reference, and minimize the error. The time period (frequency) can be added into a cost function to maximize the frequency in the region of critical soft switching operation. Thus, the cost function of MPC can include two terms: a first one is the minimization of current tracking error, and a second term is the maximization of frequency in the region of soft switching operation. The cost function can be represented as:

$$\min \sum_{k=0}^{N}\left(X_k^T Q X_k + U_k^T R U_k\right)$$

where N is the predictive horizon, and Q and R represent the weights for the two terms in the cost function.

The critical soft switching operation can be achieved by implementing the constraints on the state value, $i_L(k)$, and the input value, $[D(k); T_s(k)]$. The constraints include four parts. First, the time period should be within the range of $[T_{s\_min}, T_{s\_max}]$ according to the sampling and dead time requirements. Second, the range of duty cycle is [0, 1]. Third, the peak/valley inductor current should be higher/lower than the threshold current, $I_{th}$. Finally, the peak/valley inductor current should be lower/higher than the maximum device current, $I_{max}$, which can be derived from datasheets. Thus, the constraints can be expressed as:

$$T_{s,min} \leq T_s(k) \leq T_{s,max}$$

$$0 \leq d(k) \leq 1$$

$$\Rightarrow 0 \leq D(k) \leq T_s(k)$$

$$\begin{cases} -I_{max} \leq i_L(k) - \frac{\Delta i_L}{2} \leq -I_{th} \\ I_{th} \leq i_L(k) + \frac{\Delta i_L}{2} \leq I_{max} \end{cases}$$

$$\begin{cases} -I_{max} \leq i_L(k) - \frac{U_{in} - U_{out}}{2L} \cdot D(k) \leq -I_{th} \\ I_{th} \leq i_L(k) + \frac{U_{in} - U_{out}}{2L} \cdot D(k) \leq I_{max} \end{cases}$$

The above constraints are linear for all the state and input variables. Thus, the requirements of explicit model predictive controller can be satisfied, and the function of operating within the critical soft switching regions to reduce the switching losses can also be achieved with fast offline calculation.

The proposed MPC controller tracks the reference current to achieve the critical soft switching by the constraints. Meanwhile the maximum frequency is realized because the frequency term has been added to the cost function. So, the operating trajectories will be around the soft switching boundaries which can be derived as a function of frequency and average current. The switching frequency, $f_s$, can be expressed as:

$$f_s = \begin{cases} \frac{(1-d) \cdot d \cdot U_s}{2 \cdot (\bar{i_L} + I_{th}) \cdot L}, & i_L \geq 0 \\ \frac{(1-d) \cdot d \cdot U_s}{2 \cdot (I_{th} - \bar{i_L}) \cdot L}, & i_L \leq 0 \end{cases}$$

The process illustrated in the block 116 of the controller 110 is generally followed in every sampling instant. For the explicit model predictive, one of the advantages is the fast calculation speed because of an offline formulation of state equation parameters in high frequency operation. The cost function for the model is quadratic and the derived critical soft switching constraints (provided above) are affine. Thus, the close loop controlling regions are piecewise linear. According to the implementation of the explicit model predictive control method, a searching methodology (such as a search tree) can be derived and formulated (offline) for online tracking. The combination of piecewise linear feedback and the searching methodology will largely reduce the calculation complexity of online optimization. So, for the high frequency application, the proposed explicit model predictive control method can be sped up and satisfy the sampling requirement. Example of searching methodologies include a search tree methodology, a branch-and-bound methodology, a branch-and-cut methodology, etc.

Figure 2:
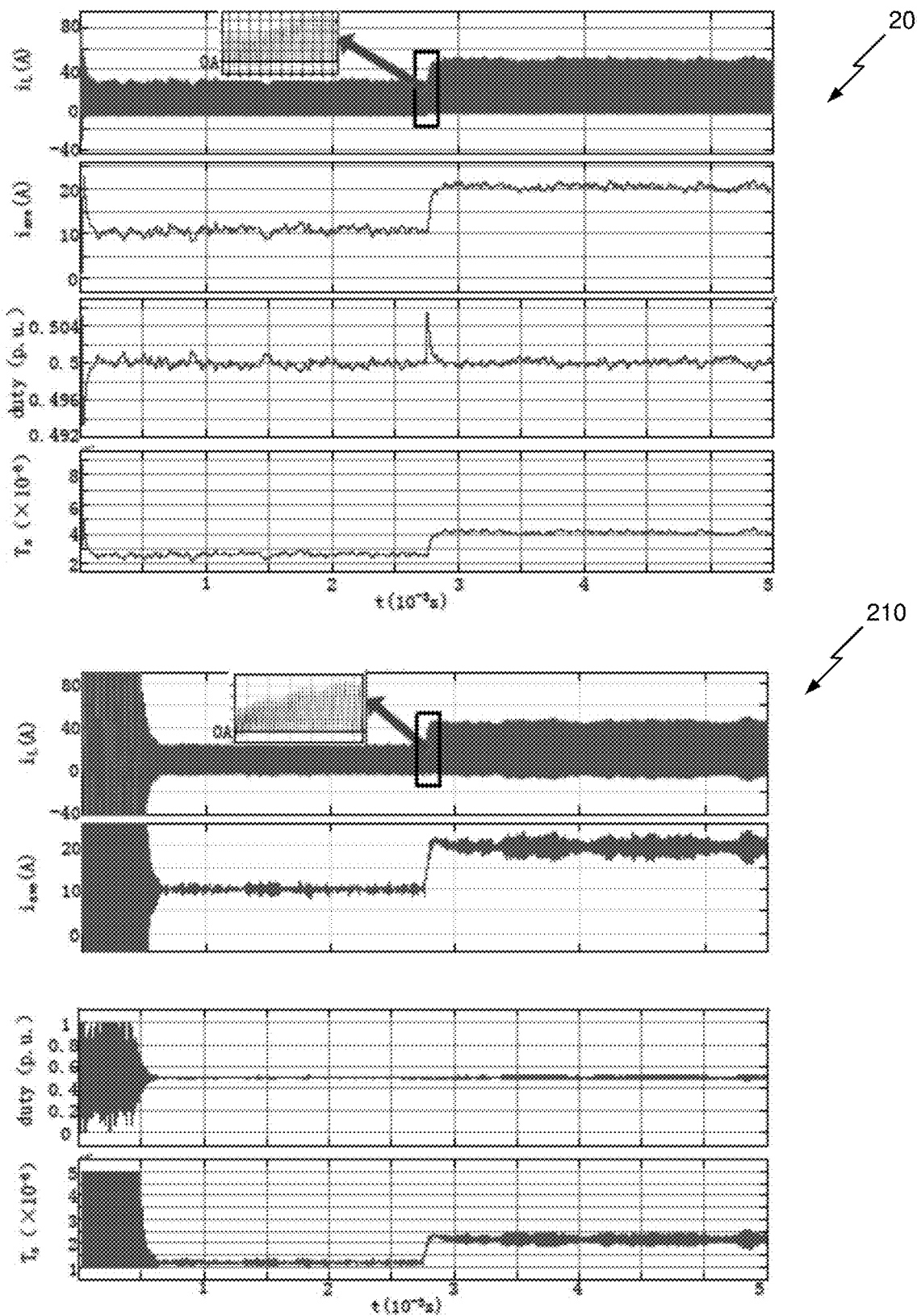
FIG. 2 include graphs showing a comparison of key waveforms resulting from the proposed variable frequency approach in contrast to waveforms achieved with a traditional PI controller.

In experimentation and testing of implementations of the device of FIG. 1, a variable-frequency model predictive control was implemented based on a typical SiC device, namely, C2M0025120D, and a rigorous testing procedure was applied. The circuit parameters included: input voltage 800V, output voltage 400V, inductor 10 uH, operation time 5.5 ms. FIG. 2 provides graph groups 200 and 210 showing a comparison of key waveforms resulting from the proposed variable frequency EMPC approach and the waveforms resulting from a traditional PI controller using the same current reference step (from 10 A to 20 A) triggered in the middle of the operating period. Specifically, the inductor current, sampling current, duty cycle and time period are given in each plot. As is shown in the graph 200, the critical soft switching constraints can be satisfied in all the operation time including the transient period. However, the traditional PI controller cannot guarantee the critical soft switching during the transient period because of the oscillation. Thus, the proposed variable-frequency model predictive control method can reduce the power losses.

Figure 3:
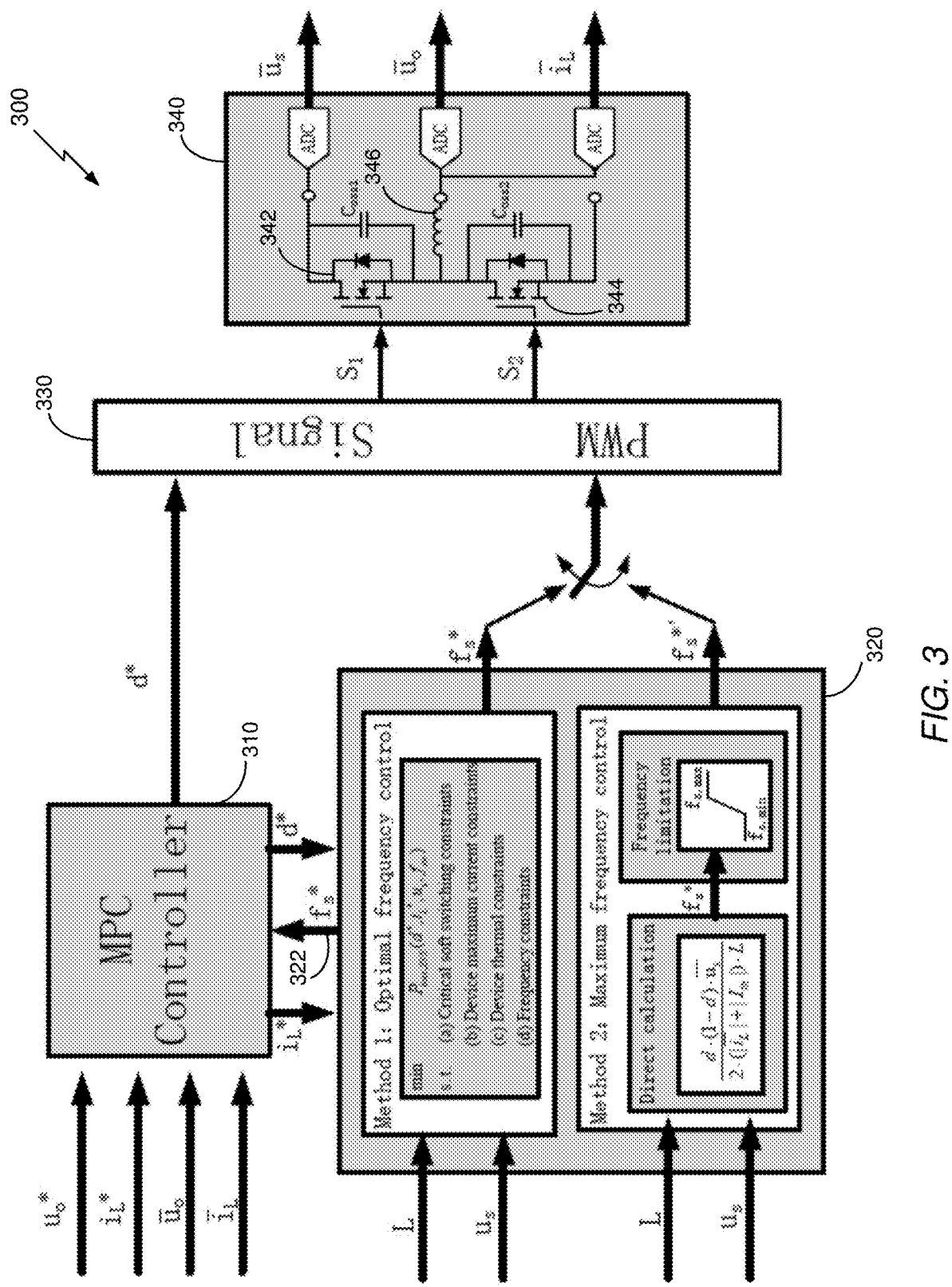
FIG. 3 is a diagram of a converter device, showing example controlling blocks for an optimal frequency approach to control soft-switching operations.

As also discussed herein, in some embodiments, a runtime (online) controlling approach may be implemented. The controller used for such embodiments (such a controller may also be implemented as a processor-based device, a customizes ASIC, etc.) includes two parts. The first part is a model predictive voltage and current control, and the second part is a frequency controller which can be based on the power loss optimization or critical soft switching boundaries (depending on the required sampling time). In the operating period, the MPC controller will track the output voltage and inductor current references to generate the duty cycle. The duty cycle will be applied for the frequency controller to determine based on the power loss optimization or critical soft switching boundaries an optimal frequency. Meanwhile, the optimal frequency will be further applied for the MPC controller to determine the time period of horizon. FIG. 3 is a diagram of a converter system 300, showing example controlling blocks for the on-line, optimal frequency approach to control soft-switching operations. Here too, although the system 300 shown and described is a DC/DC converter device, but may be adapted, in some embodiments, to operate as an AC/DC converter device (e.g. a rectifier), or DC/AC voltage converter device (e.g., an inverter). Furthermore, any of the voltage converter implementations described herein may be a uni- or bi-directional voltage converter devices.

The converter system (or device) 300 controller includes two section: a first section 310 that is the model predictive voltage and current controller, and a second section 320 that is a frequency controller computing values based on the power loss optimization or critical soft switching boundaries (depending on the required sampling time). The output of the first and second sections 310 and 320 is communicated to a pulse width modulation (PWM) signal controller 330 that is configured to generate signals ($S_1$ and $S_2$) to control/actuate one or more switching devices 342 and 344 of a voltage converter 340. At least part of the circuitry of the voltage converter 340 may be implemented similarly to the circuitry of the converter 100 depicted in FIG. 1 (e.g., the circuit configuration that includes the switching devices and inductive element(s)).

In the operating period, the MPC controller 310 will track the output voltage and inductor current references to generate the duty cycle. The duty cycle is applied for the frequency controller 320 based on the power loss optimization or critical soft switching boundaries to generate the optimal frequency. The optimal frequency, $f_s$, is also provided (applied), as output signal 322 of the frequency controller 320, to the MPC controller (first section) 310 to determine the time period of horizon. The controller sections 310 and 320 are thus configured, similarly to the controller of the device 100, to controllably vary, according to a predictive model, a subsequently applied switching frequency to the at least one switching device (in this case the switching devices 342 and 344) to maintain zero-voltage switching based on at least a present switching frequency of the at least one switching device and the inductor current of the one or more inductive elements (in this case, the inductor 346). In some examples, the controller (e.g., comprising controller sections 310 and 320) configured to controllably vary the subsequently applied switching frequency is configured to iteratively compute the subsequently applied switching frequency, according to sampled operating conditions for the at least one switching device, when sampling time of operating conditions of the voltage converter device exceeds a pre-determine threshold, or to directly compute the subsequently applied switching frequency through application of a pre-determined function applied to the sampled operating conditions for the at least one switching device when the sample time of operating conditions is equal to or is below the pre-determined threshold.

More particularly, as with the device 100 of FIG. 1, the model of the DC/DC converter according to implementations of FIG. 3 can be expressed as:

$$L\frac{di_L(t)}{dt} = d(t) \cdot U_{in} - u_{out}(t), \text{ and}$$

$$C\frac{du_{out}(t)}{dt} = i_L(t) - i_{out}(t)$$

The various parameters/variables in the above expression refer to the signals illustrated in FIG. 3. The discretized state equations for the above expressions are provided according to:

$$\begin{cases} i_L(k+1) = i_L(k) - \frac{T_s(k)}{L} \cdot u_{out}(k) + \frac{U_{in} \cdot T_s(k)}{L} \cdot d(k) \\ u_{out}(k+1) = \frac{T_s(k)}{C} \cdot i_L(k) + u_{out}(k) - \frac{T_s(k)}{C} i_o(k) \end{cases}$$

Thus, the state value, $X_k$, input value, $U_k$, parametric matrix, A and B for the discrete state equation can be expressed as:

$$X_k = [i_L(k) - i_{Lr}(k); u_{out}(k) - u_{or}(k)],$$

$$U_k = d(k)$$

$$A = \left[1, -\frac{T_s(k)}{L}; \frac{T_s(k)}{C}, 1\right]; B = \left[\frac{U_{in} \cdot T_s(k)}{L}, 0\right], \text{ and}$$

$$w(k) = \left[0, -\frac{T_s(k)}{C} \cdot i_0(k)\right].$$

To track the output voltage and inductor current references, the formulation of MPC can be expressed as:

$$\min \sum_{k=0}^{N} X_k^T Q X_k + \sum_{k=0}^{N-1} \Delta U_k^T R \Delta U_k$$

$$s.t. \ X_{k+1} = AX_k + BU_k + w_k \in \chi;$$
$$\Delta U_k = U_k - U_{k-1}; U_k U_{k-1} \in \nu$$

where Q is [q, 0; 0, q] and R is [r] (q and r represent the weight between the two terms in the cost function). It should be noted that, in each sampling instant, the MPC controller (the first section) 310 generates the duty cycle and receives the optimal frequency value from the frequency controller to update the matrix A and B.

For the frequency controller, its main purpose is to operate the converter in critical soft switching region and minimize the power losses. In every sampling period, the frequency controller 320 will receive the duty cycle and current reference values from the MPC controller 310 to calculate the optimal frequency. Two possible procedures are described herein to calculate the optimal frequency. If the sampling time is long enough, a first procedure, referred to herein as "Method 1" is applied to optimize the power losses, for example, based on a Newton's iterative method. Otherwise, a more straightforward procedure, referred to herein as "Method 2," may be realized to directly calculate the maximum feasible frequency according to the critical soft switching constraints. In this way, the critical soft switching can be determined at quick sampling rates (or operating conditions).

More particularly, the principle of Method 1 is to generate the optimal frequency based on the optimization of power losses of the DC/DC converter. As is shown in FIG. 3, the frequency controller receives the information of duty cycle and current reference from the MPC controller. Then the optimization problem is solved based on the cost function of power losses and four groups of constraints (including: critical soft switching, maximum device current, thermal and sampling requirement). The power losses cost function under critical soft switching can be expressed as four terms: switch turn-off losses, switch conduction losses, inductor losses and body diode conduction losses during the dead time. Thus:

$$\min P_{off,M} + P_{con} + P_L + P_{con,D} =$$

$$U_{dc,max} \cdot I_{ave} \cdot (t_{ru} + t_{fi}) \cdot f_{sw} + R_{ON}\left[I_{ave}^2 + \left(\frac{\Delta i_L}{2\sqrt{3}}\right)^2\right] +$$

$$\left\{K \cdot f_{sw}^x \cdot B^y + \left[I_{ave}^2 + \left(\frac{\Delta i_L}{2\sqrt{3}}\right)^2\right] \cdot R_{DCR} + \left(\frac{\Delta i_L}{2\sqrt{3}}\right)^2 \cdot R_{ACR}\right\} +$$

$$+ u_{sd} \cdot \left[T_{d,D1} \cdot \left(I_{ave} + \frac{\Delta i_L}{2}\right) + T_{d,D2} \cdot \left(I_{ave} - \frac{\Delta i_L}{2}\right)\right] \cdot f_{sw}$$

where the $t_{ru/fi}$, $R_{ON}$, K, x, y, $R_{DCR/ACR}$, $u_{sd}$, $T_{d,D1/D2}$ are the inherent parameters. The parameters $t_{ru}$ and $t_{fi}$ are the voltage rising time and current falling time during the turn-off period, K, x, and y are the core material constants, and $R_{DCR}$, $R_{ACR}$ are the DC and AC equivalent series resistance of the inductor.

The constraints mainly include critical soft switching threshold current, $I_{th}$, maximum device current, $I_{max}$, maximum thermal rising, $P_{thermal,max}$, and frequency ranges:

s.t.

(a) $\quad I_{th} \leq I_{p+} \leq I_{L,ave} + \dfrac{\Delta i_L}{2} \leq I_{max};$ (b) $\quad -I_{max} \leq I_{n-} \leq I_{L,ave} - \dfrac{\Delta i_L}{2} \leq -I_{th};$ (c) $\quad P_{sw} + P_{con} \leq P_{thermal,max} = \dfrac{T_{j,max} - T_{case}}{R_{th,J-C}};$ and (d) $\quad f_{sw,min} \leq f_{sw} \leq f_{sw,max}.$ The derived cost function and the above constraints can both be expressed as the function of the variables, ($I_{ave}$, d, $f_s$), after replacing the $\Delta i_L$ with $[(1-d)d*u_s]/(f_s*L)$. In some embodiments, the online calculation can be implemented according to the Newton's Method, by applying the $2^{nd}$ order Taylor Expansion of the power loss function, the optimal point of frequency can then be obtained with the iterative formula of $1^{st}$ and $2^{nd}$ power loss derivative in every calculating round according to:

$$f_{sw,k+1} = f_{sw,k} - \frac{P'_{loss}(f_{sw,k})}{P''_{loss}(f_{sw,k})}$$

The terminating conditions in every calculating round are the $f_{s,min}$ and $f_{s,max}$ derived from the constraints and the pre-defined error.

When faster calculation of the optimal frequency is required, Method 2 can be used to directly derive the feasible maximum frequency. With the variation of current reference, the maximum feasible frequency under the critical soft switching constraints can be derived by the function of frequency and average current, as follows:

$$f_s = \begin{cases} \dfrac{(1-d) \cdot d \cdot U_s}{2 \cdot (\overline{i_L} + i_{th}) \cdot L'} & i_L \geq 0 \\ \dfrac{(1-d) \cdot d \cdot U_s}{2 \cdot (i_{th} - \overline{i_L}) \cdot L'} & i_L \leq 0 \end{cases}$$

For implementing the maximum frequency control method, the peak/valley inductor current will be constrained around the edge of critical soft switching boundaries. Thus, the maximum device current requirement will not be violated. The device's maximum current boundary is another constraint which is located fairly far away from the operating lines. The maximum and minimum frequency filter is added in the frequency controller to give the upper and lower boundaries of the operating lines according to the sampling and dead time requirements. Thus, the frequency controller can derive the feasible maximum frequency for the MPC optimization under the critical soft switching operation.

Figure 4:
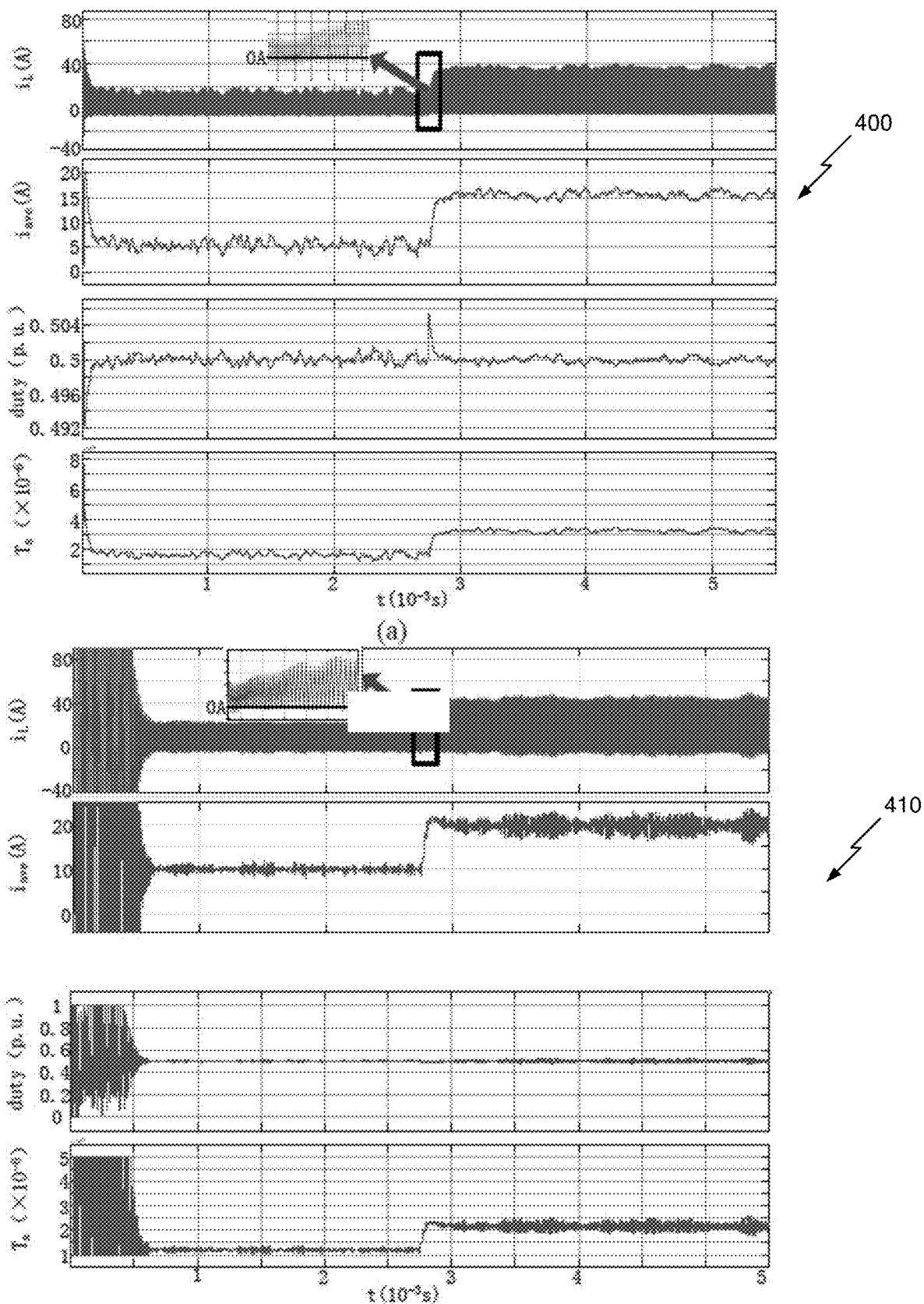
FIG. 4 include graphs showing a comparison of key waveforms resulting from the proposed optimal frequency MPC approach in contrast to waveforms achieved with a traditional PI controller.

In experimentation and testing of implementations of the system of FIG. 3, the optimal-frequency model predictive control was implemented based on a typical SiC device, namely, the C2M0025120D, and a rigorous testing procedure was applied. The circuit parameters were: input voltage 800V, output voltage 400V, inductor 10 uH, operation time 5.5 ms. FIG. 4 provide graph groups 400 and 410 showing a comparison of key waveforms resulting from the proposed optimal frequency approach (realized, for example, via the system 300) and the waveforms resulting from a traditional PI controller using the same current reference step (from 5 A to 15 A) triggered in the middle of the operating period. Specifically, the inductor current, sampling current, duty cycle and time period are given in each plot. As is shown in the graph 400 of FIG. 4, the critical soft switching constraints can be satisfied in all the operation time including the transient period. However, the traditional PI controller cannot guarantee the critical soft switching during the transient period because of the oscillation. Thus, the proposed variable-approach can further reduce the power losses.

In some embodiments, a variable-switching constant-sampling frequency critical soft switching model predictive control (VSCS-MPC) approach may also be implemented to improve the dynamic behavior, efficiency, and power density of the power converters. In such an approach, a constant sampling frequency (e.g., 100 kHz) and switching frequencies that are integer multiples of the sampling frequencies (e.g. n*100 kHz) can be used. This can simplify the control design. The VSCS-MPC includes two parts: a frequency controller to achieve the critical soft switching operation, and an MPC controller to track the output voltage/current and improve the dynamic performance. The implementation of MPC controller has a large computation burden. So, an explicit MPC method may be applied to solve the optimization problem offline. Due to the characteristic of MPC, a fixed sampling time period is required. Thus, to combine the MPC and variable frequency controller, the switching frequency is equally segmented based on a fundamental frequency, $f_{s,base}$. The MPC and frequency controller is updated with $f_{s,base}$ to guarantee enough computation time. The frequency controller calculates the expected soft switching frequency and transfers it into a discrete value for PWM based on the pre-designed bandwidth ranges. Thus, the switching frequency for PWM is discretized to be n times larger than the fundamental frequency, $f_{s,base}$, which avoids the oscillation of the time-varying switching frequency.

More particularly, for the frequency controller, the main purpose is to operate the converter in critical soft switching region and reduce the switching losses. In every fundamental time period, the frequency controller receives the duty cycle and inductor current values from the MPC controller to calculate the desired switching frequency. Then, the switching frequency is discretized based on the bandwidth ranges to derive a fixed value for the PWM. The calculation of the switching frequency is based on the critical soft switching constraints. The implementations of the frequency controller include the constraints and methodology. With respect to the constrains, the principle of the frequency controller is to generate the feasible switching frequency based on the critical soft switching boundary conditions. In every calculating period, the frequency controller receives the information of duty cycle and inductor current from the MPC controller. Then an expected switching frequency is pre-calculated for discretization based on the bandwidth ranges and sent to the PWM module. During the calculation of the expected switching frequency, four parts of constraints need to be taken into consideration: critical soft switching threshold current ($I_{th}$), maximum device current ($I_{max}$), maximum thermal rising, ($P_{thermal,max}$) and frequency ranges. For example:

(a) $\quad I_{th} \leq I_{peak} = I_{L,ave} + \frac{\Delta i_L}{2} \leq I_{max};$ (b) $\quad -I_{max} \leq I_{valley} = I_{L,ave} - \frac{\Delta i_L}{2} \leq -I_{th};$ (c) $\quad P_{sw} + P_{con} \leq P_{thermal,max} = \frac{T_{j,max} - T_{case}}{R_{th,J-C}};$ and (d) $\quad f_{sw,min} \leq f_{sw} \leq f_{sw,max}.$ The inductor current ripple is the function of three variables, ($I_{L,ave}$, d, $f_{sw}$), and is expressed as:

$$\Delta i_L = \frac{d(1-d)U_{in}}{f_s L}.$$

Thus, the calculation of expected switching frequency is based on the boundaries of the constraints to mainly satisfy the critical soft switching.

With the variation of inductor current and duty cycle, the maximum feasible frequency under the critical soft switching constraints can be derived by the function of $f_{sw}$ with respect to ($I_{L,ave}$, d). Based on the derived critical soft switching boundary conditions, the maximum frequency controller trajectories are divided by positive/negative inductor current conditions and the expected switching frequency can be expressed as:

$$f_{s,cal} = \begin{cases} \frac{(1-d) \cdot d \cdot U_{in}}{2 \cdot (\bar{i_L} + i_{th}) \cdot L'} & i_{L,ave} \geq 0 \\ \frac{(1-d) \cdot d \cdot U_{in}}{2 \cdot (i_{th} - i_{L,ave}) \cdot L'} & i_{L,ave} \leq 0 \end{cases}$$

Figure 5A:
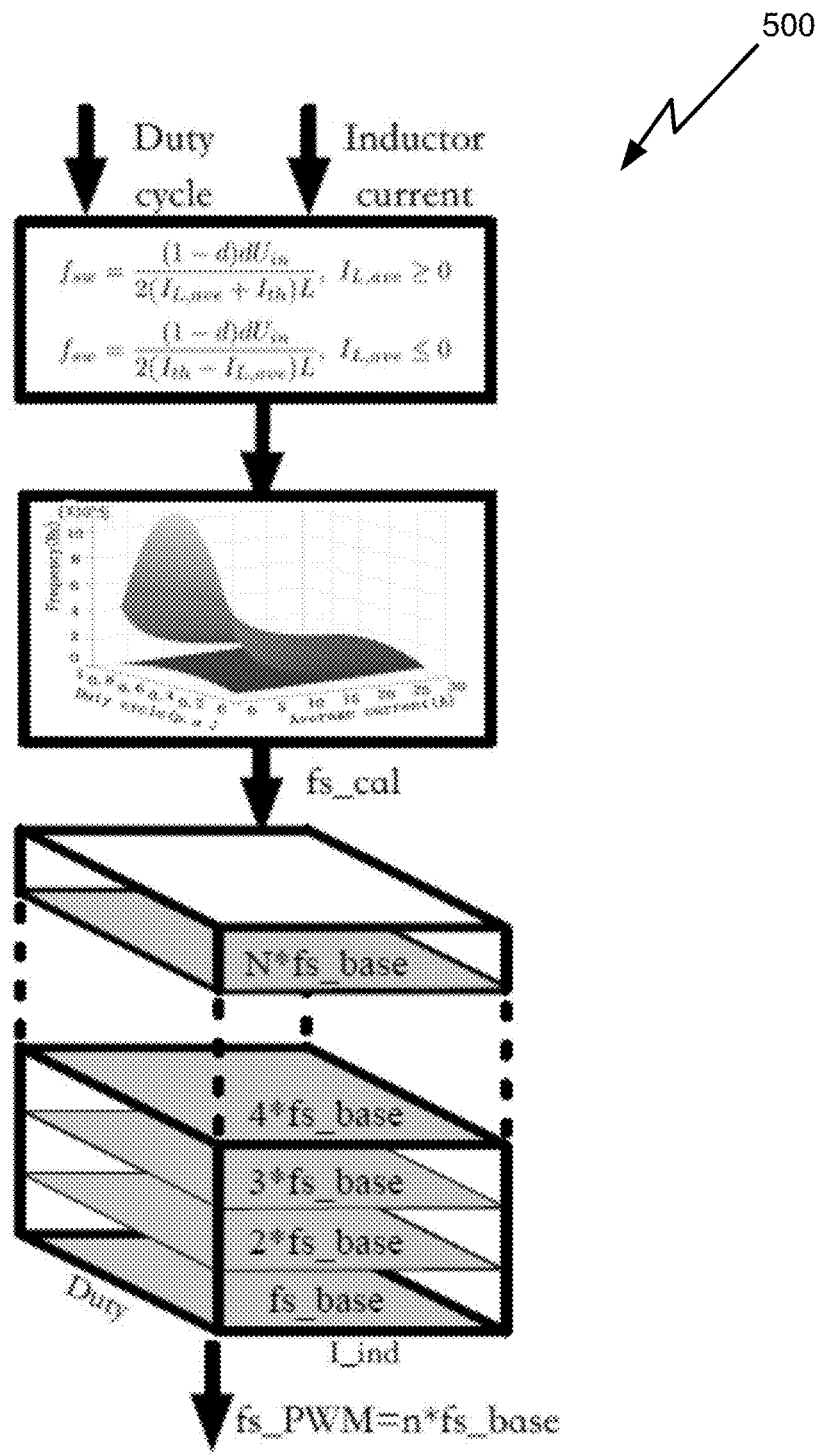
FIG. 5A is diagram of an example discrete frequency controller with equally segmented bandwidth.

After the calculation of the expected switching frequency, the values are then discretized by a pre-designed bandwidth ranges which are the integral multiple of the fundamental frequency, $f_{s,base}$. The fundamental frequency for MPC and frequency controller is set to be 30 kHz, thus the discretized frequency for PWM signals could be n times of $f_{s,base}$. It should be noted that when a certain discrete bandwidth range of the switching frequency is derived, the integral multiple value of n may be rounded down to guarantee the soft switching is maintained by choosing a relatively lower switching frequency. The implementation of the frequency controller is shown in FIG. 5A, providing a diagram of a discrete frequency controller 500 with equally segmented bandwidth.

The MPC controller aims at tracking the output voltage/current according to the pre-defined references. In every calculating period of fundamental frequency, $f_{s,base}$, the MPC controller receives the measured inductor current, and input/output voltage values, and generates the optimal duty cycle for both. Thus, in some embodiments of the devices and implementation described herein, the controller of the voltage converter device may include a model predictive control (MPC) module configured to determine, based at least in part on an inductor current and voltage across at least one capacitance element in the output section of the voltage converter device, a duty cycle provided to a pulse width modulation (PWM) signal controller and the frequency controller (a frequency controller configured to determine and generate a subsequently applied switching frequency to at least one switching device of the voltage converter device).

Firstly, the state equations of the DC/DC converter with LC filters and current source load, io, can be derived as:

$$L \frac{di_L(t)}{dt} = d(t) \cdot U_{in} - u_o(t), \text{ and}$$

$$C \frac{du_o(t)}{dt} = i_L(t) - i_o(t)$$

The discretized state equations for the above expressions are provided according to:

$$\begin{cases} i_L(k+1) = i_L(k) - \frac{T_s}{L} \cdot u_o(k) + \frac{U_{in} \cdot T_s}{L} \cdot d(k) \\ u_o(k+1) = \frac{T_s}{C} \cdot i_L(k) + u_o(k) - \frac{T_s}{C} i_0(k) \end{cases}$$

For the resistive load, the terms of $i_o(t)$ and $i_o(k)$ can be replaced with $u_o(t)/R_{load}$ and $u_o(k)/R_{load}$, respectively, where $R_{load}$ is the output resistor. For the flexibility of implementing the explicit MPC and the convenience of experimentally adjusting the input voltage during test, the term, $U_{in}(k)$, can be replaced by the phase leg output voltage, $u_x(k)$. The state equations of current source load converter can be further standardized as matrix format:

$$X_{k+1} = A_i X_k + B_i u_{ik},$$

where:

$$A_l = \begin{bmatrix} 1 & -\dfrac{T_s}{L} \\ \dfrac{T_s}{C} & 1 \end{bmatrix}, B_l = \begin{bmatrix} \dfrac{T_s}{L} & 0 \\ 0 & -\dfrac{T_s}{C} \end{bmatrix},$$

$$X_k = \begin{bmatrix} i_L(k) \\ u_o(k) \end{bmatrix}, U_{ik} = \begin{bmatrix} U_{in}d(k) \\ i_o(k) \end{bmatrix}.$$

For the resistive load converter, the standard matrix is expressed as:

$$X_{k+1} = A_r X_k + B_r u_{rk},$$

where:

$$A_r = \begin{bmatrix} 1 & -\dfrac{T_s}{L} \\ \dfrac{T_s}{C} & 1 - \dfrac{T_s}{RC} \end{bmatrix}, B_r = \begin{bmatrix} \dfrac{T_s}{L} \\ 0 \end{bmatrix},$$

$$X_k = \begin{bmatrix} i_L(k) \\ u_o(k) \end{bmatrix}, U_{rk} = U_{in}d(k).$$

To derive the state matrix for MPC formulation, the output current is regarded as the input variable. So, in the implementation of the control, the current load can be measured and adjusted as a constraint for the input vector. In the standardized state matrix, the voltage/current references can be defined as $\overline{X}$ and the tracking errors between the measurement and the references are expressed as $\tilde{X}$.

$$\overline{X}_k = \begin{bmatrix} i_{Lr} \\ u_{or} \end{bmatrix}, \tilde{X}_k = \begin{bmatrix} i_{Lr} - i_L(k) \\ u_{or} - u(k) \end{bmatrix}.$$

Thus, the cost function includes two terms, and expressed according to:

$$\min \sum_{k=0}^{N_c} \tilde{X}_k^T Q \tilde{X}_k + \sum_{k=0}^{N_p-1} \Delta u_k^T R \Delta u_k$$

For the penalties of the cost function, Q and R represent the weighing factor matrices that are implemented on the state values and input values, respectively. For the state value part, more weight is addressed on output voltage in current source load converter because the inductor current is restricted by the current load. For the input value part, more weight is addressed on duty cycle to stabilize the system behavior. Example values for Q and R are [1, 0; 0, 1000] and [1000, 0; 0, 1], respectively. Other values may be used instead.

The constraints of the MPC controller can be expressed as:

$$\tilde{X}_{k+1} = A\tilde{X}_k + Bu_k \in \chi$$

$$\Delta u_k = u_k - u_{k-1} \in u$$

$$\begin{bmatrix} -I_{L,max} \\ 0 \end{bmatrix} \leq X_k \leq \begin{bmatrix} I_{L,max} \\ i_o(k) \end{bmatrix}$$

The constraints of current source converter input values can be expressed as:

$$\begin{bmatrix} 0 \\ i_o(k) \end{bmatrix} \leq u_{ik} \leq \begin{bmatrix} U_{in} \\ i_o(k) \end{bmatrix}$$

Since the second term of the input vector, $u_{ik}$, is output current which could be a measurable current source load, it is directly assigned with the actual measured value by setting the constraints as shown above. By this configuration of the constraints, the output current load values can be measured and adjusted in real time for the implementations of the explicit MPC controller. The constraints of resistive load converter input value can be expressed as:

$$[0] \leq u_{rk} \leq [u_{in}]$$

To achieve a high frequency for the DC/DC converter and reduce the calculation load of the controller, the MPC problem is solved explicitly by generating a piecewise affine feedback law. The state model and constraints of the dynamic system are built offline to generate an online searching methodology (such as a search) tree and feedback law for optimization. In each controlling time period, the active region, r, is searched with the matrices $H_r$ and $K_r$. Then, in each of the specific active region, the corresponding feedback law matrices, $F_r$ and $G_r$, are applied to calculate the optimal input values with the prediction horizon. Only the first value of the input matrix is applied to the dynamic system for MPC control.

In every fundamental time period, the pre-designed searching methodology (e.g., search tree) can find the optimal duty cycle based on the updated state values of inductor current/output voltage. Explicit MPC avoids the time-consuming online optimization process, and thus it is suitable for high frequency control.

Figure 5B:
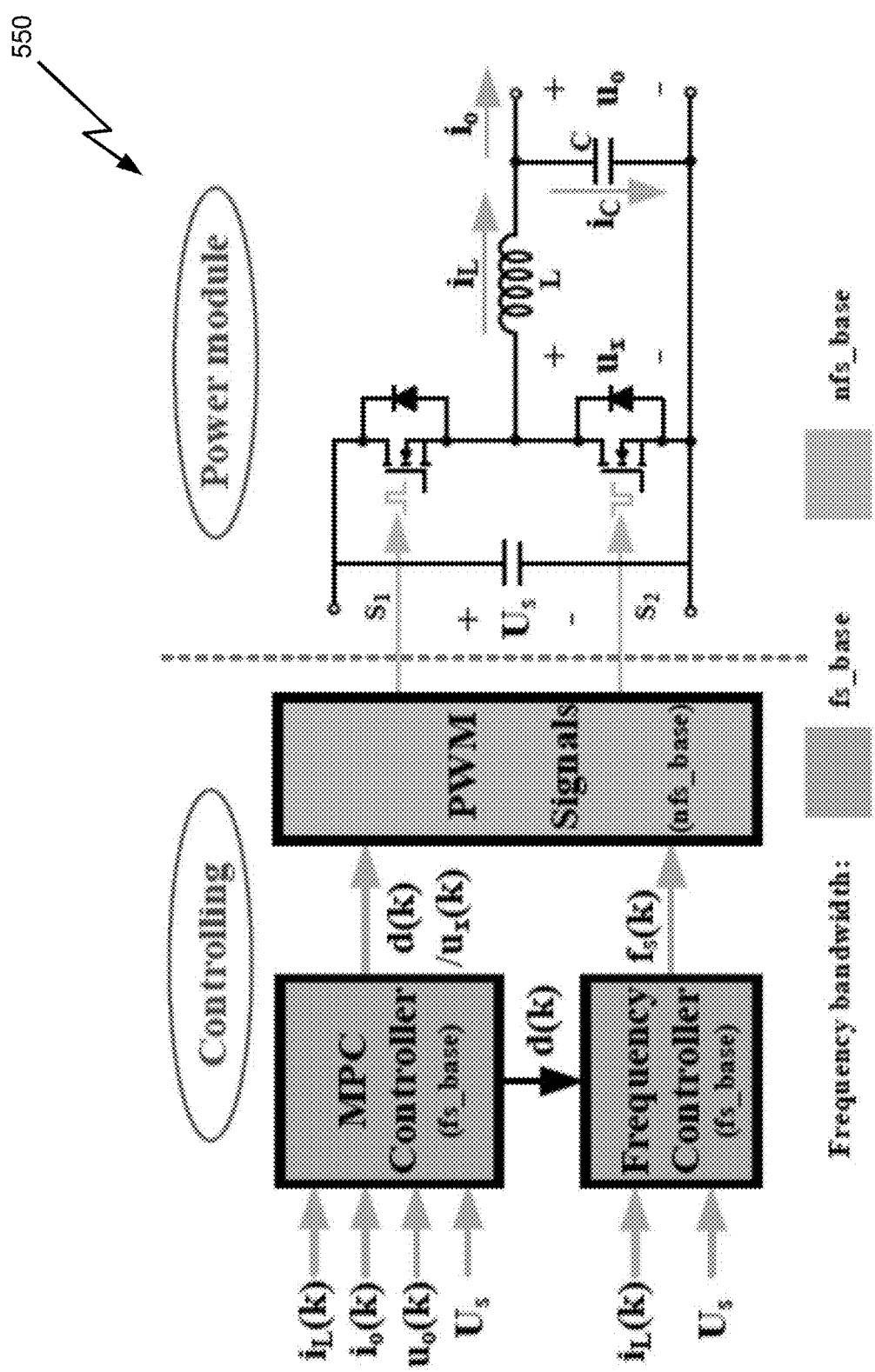
FIG. 5B is a diagram of an example variable-switching constant-sampling frequency critical soft-switching model-predictive control system.

FIG. 5B is a diagram of an example VSCS-MPC system 550. At each sampling period of $T_{s,base}$, the frequency controller receives the measurement of inductor current from ADC and duty cycle from MPC controller. The discretized frequency (n times of $f_{s,base}$) will be generated from, the frequency controller and delivered to update the carrier for the PWM signals. This mechanism can stabilize the consistency of sampling, triggering of the control and updating of the PWM. Thus, the discrete frequency bandwidth could avoid a time-varying switching frequency and improve the system stability.

Figure 6:
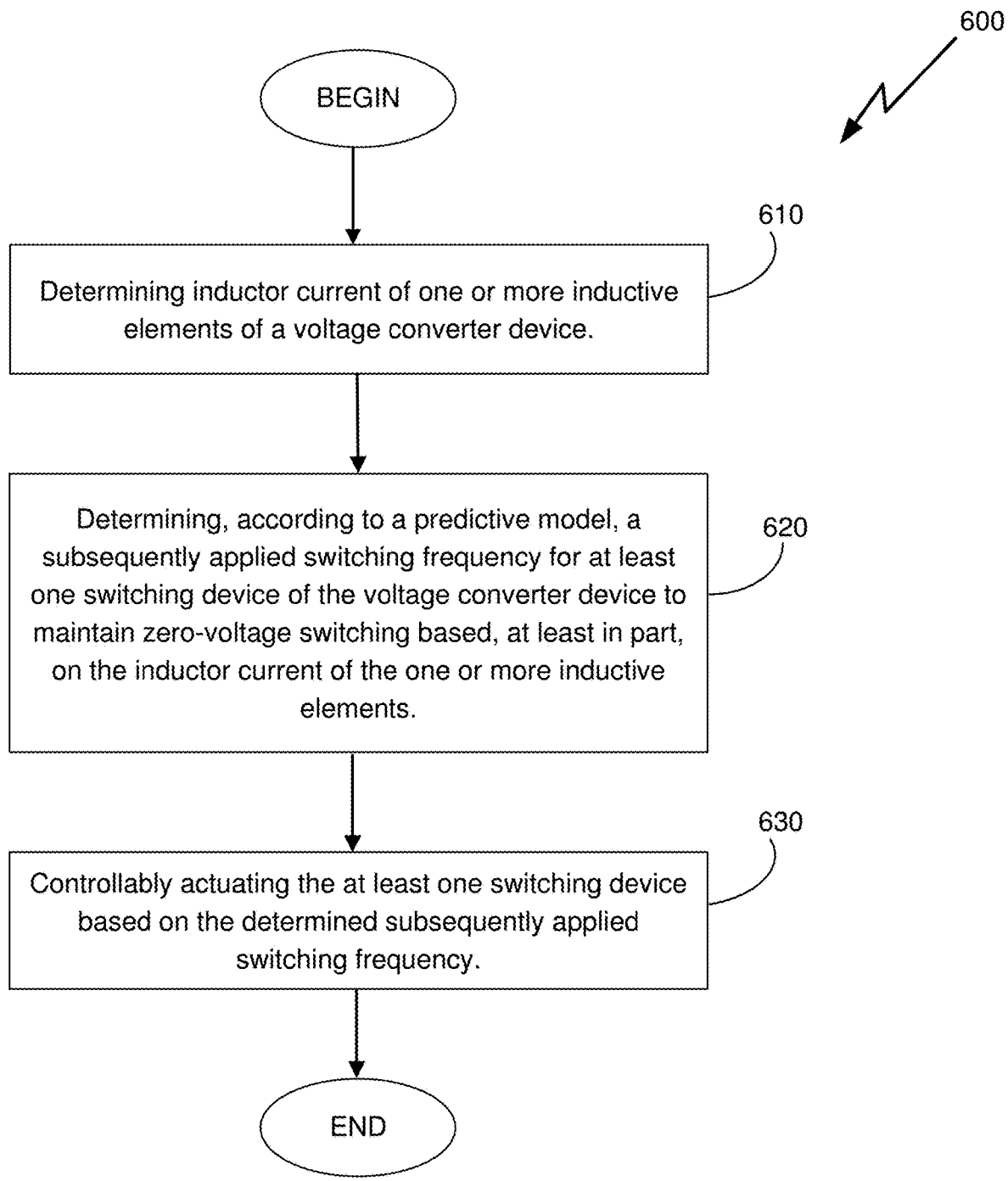
FIG. 6 is a flowchart of an example procedure for soft switching in power converters.

With reference next to FIG. 6, a flowchart of an example procedure 600 for soft switching of power converters is shown. The procedure 600 includes determining 610 inductor current of one or more inductive elements of a voltage converter device. Such determination of the inductor current may be performed, for example, by directly or indirectly measuring (e.g., using current sensors, voltage sensors, or other types of sensing devices) the inductor current, estimating the inductor current from capacitor voltage measurements, etc. As noted, the voltage converter device may be a DC/DC voltage converter device, an AC/DC voltage converter device, or a DC/AC voltage converter device/system (most of the discussion provided herein is for an example DC/DC voltage converter system or device).

The procedure 600 further includes determining 620, according to a predictive model, a subsequently applied switching frequency for at least one switching device of the voltage converter device to maintain zero-voltage switching based, at least in part, on the inductor current of the one or more inductive elements. In some embodiments, determining the subsequently applied switching frequency comprises intermittently determining the subsequently applied frequency at regular or irregular time intervals (e.g., based on intermittent determination of operating conditions of the voltage converter device, including intermittent measurements of inductor current and other operating characteristics of the voltage converter device).

In some examples, determining the subsequently applied switching frequency may include determining a reference current, e.g., by a proportional integral (PI) controller, such as the PI controller 112 of FIG. 1, included in the controller circuitry (be it a processor-based controller circuitry or some other controller implementation), and determining (e.g., by, an EMPC controller, such as the cascaded EMPC controller 114 arranged downstream of the PI controller) based at least in part on the reference current and the determined inductor current, control-signaling to control one or more of, for example, a duty cycle for the at least one switching device, the variable subsequently applied switching frequency for the at least one switching device, and/or output voltage of the voltage converter device. Those signal may be provided to a PWM signals generator, which in turn may generate the actuating signals applied to the switching device(s), such as the switching devices 130 and/or 132 of FIG. 1, or may be directly applied to the switching device(s). Determining the control-signaling may include determining the control signaling according to an optimization process using a cost function to minimize a current tracking error between the reference current and the inductor current of the one or more inductive elements, and maximize soft switching frequency of the at least one switching device. In some embodiments, determining the control-signaling according to the optimization process may include determining the control signaling according to the optimization process subject to one or more constraints that includes, for example, a bounded frequency range, a maximum peak inductor current, a minimum peak inductor current, a maximum valley inductor current, and/or a minimum valley inductor current. In such embodiments, determining the control-signaling may also include deriving a searching methodology (e.g., search tree methodology, branch-and-bound methodology, branch-and-cut methodology, etc.) to determine the subsequently applied switching frequency as an output of the searching methodology based on one or more of, for example, the present switching frequency of the at least one switching device, a present duty cycle corresponding to the present switching frequency, and/or the inductor current of the one or more inductive elements. Entries of the search tree may be determined according to an optimization process to minimize total power losses by the voltage converter device subject to the one or more constraints.

In some examples (such as those discussed in relation to FIG. 3), determining the subsequently applied switching frequency may include iteratively computing the subsequently applied switching frequency, according to sampled operating conditions for the at least one switching device, when sampling time of operating conditions of the voltage converter device exceeds a pre-determine threshold, or directly computing the subsequently applied switching frequency through application of a pre-determined function applied to the sampled operating conditions for the at least one switching device when the sampling time of operating conditions is equal to or is below the pre-determined threshold.

In some examples, determining, according to the predictive model, the subsequently applied switching frequency may include determining the subsequently applied switching frequency from a plurality of discretized candidate switching frequencies that are each an integer multiple, n, of a sampling frequency, $f_s$, to sample operating conditions of the voltage converter device based on which the inductor current of the one or more inductive elements is determined.

With continued reference to FIG. 6, the procedure 600 additionally includes controllably actuating 630 the at least one switching device based on the determined subsequently applied switching frequency. In some examples, controllably actuating the at least one switching device may include controllably actuating the at least one switching device according to the subsequently applied switching frequency to maintain the zero-voltage switching over a wide operating range.

Performing the various techniques and operations described herein may be facilitated by a controller system, such as a processor-based computing system (e.g., to perform the off-line or runtime/on-line computations of some the approaches described herein). Such a controller system may include a processor-based device such as a personal computer, a specialized computing device, and so forth, that typically includes a central processor unit or a processing core. In addition to the CPU, the system includes main memory, cache memory and bus interface circuits. The processor-based device may include a mass storage element, such as a hard drive (solid state hard drive, or other types of hard drive), or flash drive associated with the computer system. The controller system may further include a keyboard, or keypad, or some other user input interface, and a monitor, e.g., an LCD (liquid crystal display) monitor, that may be placed where a user can access them.

The processor-based device is configured to facilitate, for example, the implementation of predictive models to achieve soft switching operations for voltage converters. The storage device may thus include a computer program product that when executed on the processor-based device causes the processor-based device to perform operations to facilitate the implementation of procedures and operations described herein. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, a graphics processing unit (GPU), an application processing unit (APU), etc., may be used in the implementation of the controller system. Other modules that may be included with the processor-based device are speakers, a sound card, a pointing device, e.g., a mouse or a trackball, by which the user can provide input to the controller system. The processor-based device may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A voltage converter device comprising:
one or more inductive elements to deliver inductor current to an output section of the voltage converter device;
at least one switching device to control current flow at the output section of the voltage converter device; and
a controller to controllably vary, according to a predictive model that corresponds to a cost function, a subsequently applied switching frequency to the at least one switching device to maintain zero-voltage switching based, at least in part, on the inductor current of the one or more inductive elements, wherein, to controllably vary, according to the predictive model that corresponds to the cost function, the subsequently applied switching frequency, the controller is configured to vary the subsequently applied switching frequency according to an optimization process that uses the cost function.

2. The voltage converter of claim 1, wherein the controller configured to controllably vary the subsequently applied switching frequency to the at least one switching device to maintain zero-voltage switching is configured to controllably vary the subsequently applied switching frequency to the at least one switching device to maintain the zero-voltage switching over a wide operating range.

3. The voltage converter device of claim 1, wherein the controller comprises:
a proportional integral (PI) controller to determine a reference current, and
a model predictive control (MPC) module arranged in a cascade to the PI controller, and configured to determine, based at least in part on the reference current and the inductor current, control-signaling to control one or more of: a duty cycle for the at least one switching device, the variable subsequently applied switching frequency for the at least one switching device, or output voltage of the voltage converter device.

4. The device of claim 3, wherein the MPC module is configured to determine the control signaling according to the optimization process using the cost function to minimize a current tracking error between the reference current and the inductor current of the one or more inductive elements, and maximize soft switching frequency of the at least one switching device.

5. The device of claim 4, wherein the MPC module is configured to determine the control signaling according to the optimization process subject to one or more constraints comprising: a bounded frequency range, a maximum peak inductor current, a minimum peak inductor current, a maximum valley inductor current, or a minimum valley inductor current.

6. The device of claim 5, wherein the controller configured to controllably vary the subsequently applied switching frequency is configured to:
derive a searching methodology to determine the subsequently applied switching frequency as an output of the searching methodology based on one or more of: the present switching frequency of the at least one switching device, a present duty cycle corresponding to the present switching frequency, or the inductor current of the one or more inductive elements;
wherein entries of the search methodology are determined according to the optimization process to minimize total power losses of the voltage converter device subject to the one or more constraints.

7. The device of claim 1, wherein the controller configured to controllably vary the subsequently applied switching frequency is configured to:
iteratively compute the subsequently applied switching frequency, according to sampled operating conditions for the at least one switching device, when sampling time of operating conditions of the voltage converter device exceeds a pre-determine threshold, or
directly compute the subsequently applied switching frequency through application of a pre-determined function applied to the sampled operating conditions for the at least one switching device when the sample time of operating conditions is equal to or is below the pre-determined threshold.

8. The device of claim 1, wherein the voltage converter device comprises one of: a DC/DC voltage converter device, an AC/DC voltage converter device, or a DC/AC voltage converter device.

9. The voltage converter device of claim 1, further comprising one or more capacitance elements in the output section of the voltage converter device.

10. The voltage converter device of claim 9, wherein the controller comprises:
a model predictive control (MPC) module configured to determine, based at least in part on the inductor current and voltage across at least one of the one or more capacitance elements, a duty cycle provided to a pulse width modulation (PWM) signal controller and a frequency controller configured to determine and generate the subsequently applied switching frequency to the at least one switching device.

11. The voltage converter device of claim 1, wherein the controller configured to controllably vary the subsequently applied switching frequency to the at least one switching device is configured to:

determine the subsequently applied switching frequency from a plurality of discretized switching frequencies that are each an integer multiple, n, of a sampling frequency, $f_s$, to sample operating conditions of the voltage converter device based on which the inductor current of the one or more inductive elements is determined.

12. The voltage converter device of claim 1, wherein the controller configured to controllably vary the subsequently applied switching frequency to the at least one switching device is configured to:
controllably vary the subsequently applied switching frequency to maintain zero-voltage switching further based on one or more of: soft switching boundary constraints, or output voltage measurements.

13. A method for voltage conversion, comprising:
determining inductor current of one or more inductive elements of a voltage converter device;
determining, according to a predictive model that corresponds to a cost function, a subsequently applied switching frequency for at least one switching device of the voltage converter device to maintain zero-voltage switching based, at least in part, on the inductor current of the one or more inductive elements, wherein the determining, according to the predictive model that corresponds to the cost function, the subsequently applied switching frequency is further based on an optimization process that uses the cost function; and
controllably actuating the at least one switching device based on the determined subsequently applied switching frequency.

14. The method of claim 13, wherein determining the subsequently applied switching frequency comprises intermittently determining the subsequently applied frequency at regular or irregular time intervals.

15. The method of claim 13, wherein controllably actuating the at least one switching device comprises:
controllably actuating the at least one switching device according to the subsequently applied switching frequency to maintain the zero-voltage switching over a wide operating range.

16. The method of claim 13, wherein determining the subsequently applied switching frequency comprises:
determining a reference current; and
determining, based at least in part on the reference current and the determined inductor current, control-signaling to control one or more of: a duty cycle for the at least one switching device, the variable subsequently applied switching frequency for the at least one switching device, or output voltage of the voltage converter device.

17. The method of claim 16, wherein determining the control-signaling comprises determining the control signaling according to the optimization process using the cost function to minimize a current tracking error between the reference current and the inductor current of the one or more inductive elements, and maximize soft switching frequency of the at least one switching device.

18. The method of claim 17, wherein determining the control-signaling according to the optimization process comprises:

determining the control signaling according to the optimization process subject to one or more constraints comprising: a bounded frequency range, a maximum peak inductor current, a minimum peak inductor current, a maximum valley inductor current, or a minimum valley inductor current.

19. The method of claim 18, wherein determining the control-signaling comprises:
deriving a searching methodology to determine the subsequently applied switching frequency as an output of the searching methodology based on one or more of: the present switching frequency of the at least one switching device, a present duty cycle corresponding to the present switching frequency, or the inductor current of the one or more inductive elements;
wherein entries of the searching methodology are determined according to the optimization process to minimize total power losses by the voltage converter device subject to the one or more constraints.

20. The method of claim 13, wherein determining the subsequently applied switching frequency comprises:
iteratively computing the subsequently applied switching frequency, according to sampled operating conditions for the at least one switching device, when sampling time of operating conditions of the voltage converter device exceeds a pre-determine threshold, or
directly computing the subsequently applied switching frequency through application of a pre-determined function applied to the sampled operating conditions for the at least one switching device when the sampling time of operating conditions is equal to or is below the pre-determined threshold.

21. The method of claim 13, wherein determining, according to the predictive model, the subsequently applied switching frequency comprises:
determining the subsequently applied switching frequency from a plurality of discretized candidate switching frequencies that are each an integer multiple, n, of a sampling frequency, $f_s$, to sample operating conditions of the voltage converter device based on which the inductor current of the one or more inductive elements is determined.

22. Non-transitory computer readable media comprising computer instructions executable on a processor-based device to:
determine inductor current of one or more inductive elements of a voltage converter device;
determine, according to a predictive model that corresponds to a cost function, a subsequently applied switching frequency to at least one switching device of the voltage converter device to maintain zero-voltage switching based, at least in part, on the inductor current of the one or more inductive elements and on an optimization process that uses the cost function; and
controllably actuate the at least one switching device based on the determined subsequently applied switching frequency.

* * * * *

UNITED STATES PATENT AND TRADEMARK OFFICE
CERTIFICATE OF CORRECTION

PATENT NO. : 11,711,009 B2
APPLICATION NO. : 17/076133
DATED : July 25, 2023
INVENTOR(S) : Matthias Preindl et al.

Page 1 of 1

It is certified that error appears in the above-identified patent and that said Letters Patent is hereby corrected as shown below:

In the Specification

Column 16, Line 61, "$U_{in}(k)$" should be --$U_{in}d(k)$--.

Signed and Sealed this
Twenty-seventh Day of May, 2025

Coke Morgan Stewart
*Acting Director of the United States Patent and Trademark Office*